United States Patent [19]

Müller

[11] 4,115,715
[45] Sep. 19, 1978

[54] BRUSHLESS D. C. MOTOR

[75] Inventor: Rolf Müller, St. Georgen i.Schwarzwald, Germany

[73] Assignee: Papst-Motoren KG, St. Georgen i.Schwarzwald, Germany

[21] Appl. No.: 762,822

[22] Filed: Jan. 25, 1977

Related U.S. Application Data

[63] Continuation of Ser. No. 565,761, Apr. 7, 1975, abandoned.

[30] Foreign Application Priority Data

Apr. 8, 1974 [LU] Luxembourg ............................ 69810
Oct. 25, 1974 [LU] Luxembourg ............................ 71180

[51] Int. Cl.$^2$ .......................................... H02K 11/00
[52] U.S. Cl. ................................ 310/68 B; 310/67 R;
310/156; 318/254
[58] Field of Search ................... 310/67, 68 R, 68 B,
310/46, 10, DIG. 3, 156, 68 E; 338/32 H;
318/138, 254

[56] References Cited

U.S. PATENT DOCUMENTS

| 3,548,223 | 12/1970 | Dittrich et al. | 310/10 |
| 3,548,224 | 12/1970 | Dittrich et al. | 310/10 |
| 3,644,765 | 2/1972 | Janson | 310/68 |
| 3,805,134 | 4/1974 | Osamn et al. | 318/254 |
| 3,961,211 | 6/1976 | Verques | 318/254 X |

Primary Examiner—Donovan F. Duggan
Attorney, Agent, or Firm—Wenderoth, Lind & Ponack

[57] ABSTRACT

In a brushless d.c. motor with a permanent magnet rotor with the recessing of a radial narrow air gap, a part of the flux emanating from the rotor is concentrated onto a stationary magnetic flux sensitive control member which controls a commutator circuit. For concentration of the flux onto the control member, there is used a stationary magnetic flux conductor which extends between unlike rotor poles under recessing of a narrow air gap on both its ends. At least one of these air gaps is radially directed.

35 Claims, 17 Drawing Figures

BRUSHLESS D. C. MOTOR

This is a continuation of application Ser. No. 565,761, filed Apr. 7, 1975 now abandoned.

BACKGROUND OF THE INVENTION

The invention relates to a brushless d.c. motor with a permanent magnet rotor with the recessing of a radial narrow air gap, a part of the flux emanating from the rotor being concentrated by a stationary magnetic flux conductor onto a stationary magnetic flux-sensitive control member which controls a commutator circuit. Both here and hereinafter a narrow air gap is understood to mean an air gap which is as narrow as it is used within practical manufacturing tolerances of electric motors.

As a function of changes in the magnetic flux flowing through it, the control member which can be, for example, an induction coil or a Hall generator, generates an electrical control signal which controls the commutator circuit as a function of the rotor position.

From U.S. Pat. No. 3,644,765, there is known a d.c. motor having a Hall generator for controlling the commutator circuit. This Hall generator is positioned between two magnetic flux conductors, the free end of one of which recesses an axial air gap and faces the permanent magnet of the rotor, while the other of which projects via its free end into an induction coil of the stator. This known motor requires an axial adjustment of the rotor relative to the stator during assembly in order to adjust the axial air gap of the magnetic flux conductor to the necessary predetermined value for the control signal of the commutator circuit. Furthermore, in this known motor the Hall generator takes up a considerable amount of space in an area betwen the rotor magnet and the induction coil which is critical from the standpoint of space requirements.

In a d.c. motor of the type shown in German DAS No. 1,911,836, a Hall generator for controlling the commutator circuit is positioned on that side of the stator induction coil which faces the rotor permanent magnet. It is therefore located in the stray flux range of the magnetic field emanating directly from the induction coil and indirectly from the rotor. The stray flux is concentrated onto the Hall generator by magnetic flux conductors directed toward the induction coil.

SUMMARY OF THE INVENTION

It is therefore an object of this invention to provide a d.c. motor whereby it is possible to concentrate a magnetic flux component onto the control member in such a way that the signal necessary for controlling the commutator circuit is clearly and reliably generated.

It is another object of this invention to provide such a d.c. motor while avoiding as much as possible the need for additional space requirements and expenditure during manufacture.

It is still another object of this invention to provide such a d.c. motor whereby it is possible to concentrate a large flux portion on the control member, even when employing small components.

The smaller the air gaps in a d.c. motor the larger is the efficiency of the motor. In the mass production of some d.c. motors of the type indicated above, for reasons of simplicity only, the radial tolerance of the air gap between rotor and stator is accurately set, while no relatively expensive accurate axial setting takes place.

It is therefore still another object of this invention to provide a d.c. motor whereby all necessary air gaps which are to be adjusted need be adjusted only in the radial direction and do not depend on an accurate axial setting.

It is still another object of this invention to provide that only radially oriented air gaps are necessary.

It is still another object of this invention to provide that measures which may be necessary for maintaining the tolerances of the radially oriented air gaps can take place simultaneously with those for setting the radial tolerance of the rotor.

These and further objects, features and advantages of the present invention will become more obvious from the following description when taken in connection with the accompanying drawings which show for purposes of illustration only several embodiments in accordance with the present invention.

BRIEF DESCRIPTION OF THE DRAWINGS

The invention is explained hereinafter with reference to the accompanying drawings wherein.

DETAILED DESCRIPTION OF THE INVENTION

Figure 1:
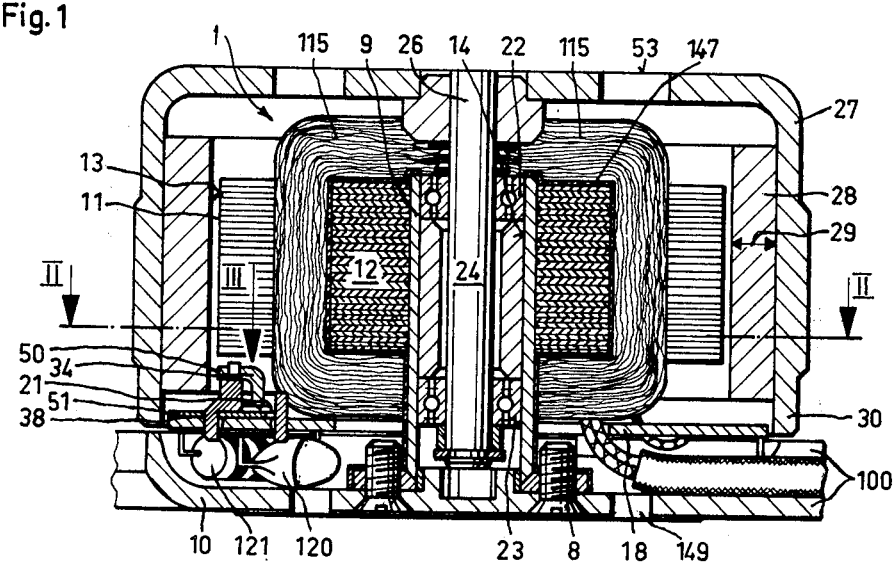
FIG. 1 is a section parallel to the axis of a d.c. motor according to the invention.

In FIGS. 1 to 8 and 15, a laminated stator 1 has laminations 12 which are placed on three mandrels 5, 6, 7 each having a thickened portion 4, so that the laminations always rest on the shoulders 2 of the thickened portions 4. Retaining rings 23 placed on the free ends of mandrels 5, 6, 7 contact the other end surface of the laminations and initially hold the laminations compactly together.

A bearing pipe 9 is pressed into a recessed central hole through the laminations. The thus produced group of laminations 12 and pipe 9 is covered by a resin coat 147 over its entire exposed surface, e.g. by whirl sintering, with the exception of the peripheral surface 13 of the group of laminations 12 facing an air gap 11 as well as the inside surface 14 of bearing pipe 9. Two induction coils 115, 116 are then wound onto the resin-coated group of laminations 12. This stator 1 is attached to a chassis shell 10 via screws 8 extending into a flange of bearing pipe 9, and the chassis shell 10 is connected at the point of use with the attachment members 100 of the motor. Mandrels 5, 6 and 7 have extended from their thickened portions 4 extensions 15, 16, 17 on which a printed circuit board 18 is mounted and supported on the adjacent shoulders 19 of the thickened portions 4. Circuit board 18 is secured by retaining rings 20 fitted onto the extensions 15, 16, 17.

On the printed circuit board 18, formed e.g. by stamping, are arranged the circuit elements 120, 121 etc. of the commutator circuit, which is controlled by a Hall generator 21. The circuit elements of the commutator circuit are only partly shown. Printed conductors of the commutator circuit are provided on the printed circuit board 18 on the motor side thereof. The Hall generator 21 is also provided on the motor side of circuit board 18, whereas the remaining circuit elements of the commutator circuit are fitted to the printed circuit board on the side thereof remote from the motor. Heat generating circuit elements, e.g. power transistors are preferably located on the side remote from the motor, i.e. with minimum thermal resistance toward chassis shell 10 which is equipped with openings 149 through which cooling air can pass.

Rotor 53 of the motor has a rotor shaft 24 which is pivoted in two ball bearings 22, 23 in bearing pipe 9. The end 26 of rotor shaft 24 projects from stator 1 and carries a sheet iron container 27 which is open toward chassis shell 10 and wherein is mounted an annular permanent magnet 28 which is magnetized in a bipolar manner in the radial direction as shown by double arrow 29. That means nearly one half of the periphery of magnet 28 is magnetized in a first radial direction and nearly the other half of its periphery is magnetized in a second opposite radial direction. The iron container 27 is a magnetic inference. The free edge 30 of container 27 projects axially beyond permanent magnet 28.

Figure 2:
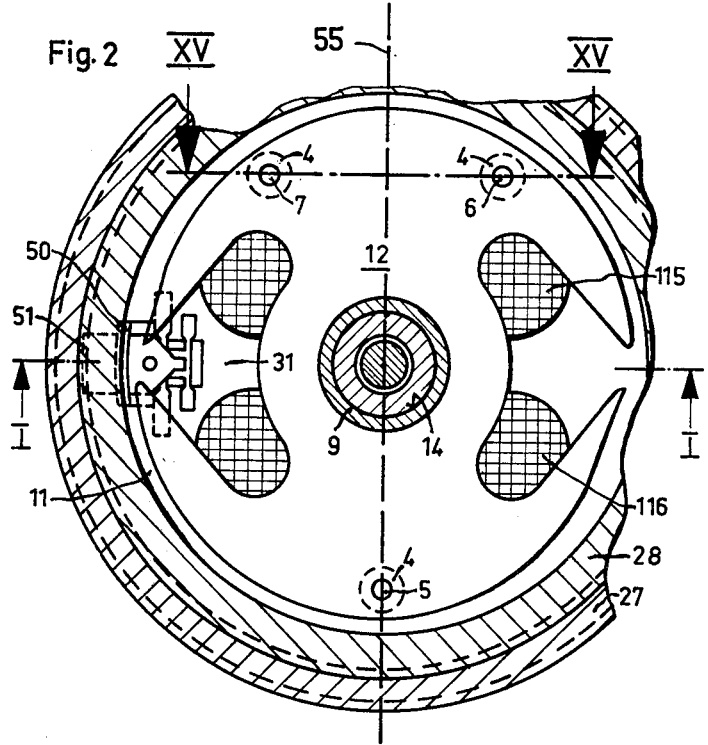
FIG. 2 is a partial section along line II—II of FIG. 1, particularly illustrating the stator.
Figure 3:
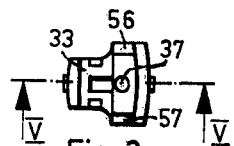
FIG. 3 illustrates a plastic molding support shown in FIGS. 1 and 2 viewed in the direction of arrow III in FIG. 1 but laterally displaced relative to FIG. 1.
Figure 4:
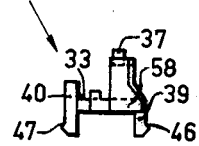
FIG. 4 is a side view along the arrow IV in FIG. 3.
Figure 5:
FIG. 5 is a section along the arrow V—V in FIG. 3.

In the stator plates, the mandrels 5, 6, 7 are only 1.5 mm thick (the scale of FIGS. 1 and 2 is approximately 2:1) and are arranged symmetrically to the magnetic main axis 55 of the stator in order to impair to a minimum the magnetic conditions, the symmetry of torque and the lamination action.

The Hall generator 21 which extends flat and parallel to the plane of FIG. 2 responds to magnetic flux changes which pass through the Hall generator 21 in a direction perpendicular to the plane of FIG. 2. Hall generator 21 is positioned in the stray flux of permanent magnet 28 and more specifically in the space 31 between the two induction coils 115 and 116.

Figure 6:
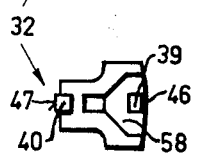
FIG. 6 is a bottom view in the direction of arrow VI in FIG. 4.
Figure 7:
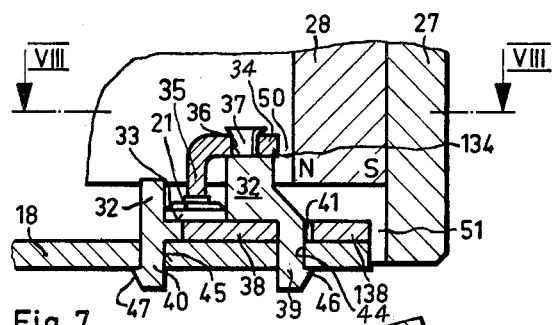
FIG. 7 is a section along line VII—VII in FIG. 8 corresponding to FIG. 1 but on an enlarged scale of components which participate in the magnetic control of the control member, also laterally displaced relative to FIG. 1.

The Hall generator 21 is fitted into a plastic molding support 32 shown in FIGS. 3 to 6 which has a depression 33 of exact dimensions to receive the Hall generator. An angular sheet iron magnetic flux conductor 34 is fitted into the plastic molding support 32 with one end 35 vertically directed toward the Hall generator 21. Conductor 34 is secured to support 32 by hot heading of mandrel 37 as shown in FIG. 7. Magnetic flux conductor 34, which is constructed as an inexpensive curved stamping, has an opening 36 therein through which fits the mandrel 37 of the plastic molding support 32. A second flat sheet iron magnetic flux conductor 38, also produced by stamping, is fixed to the underside of the plastic molding support 32, as shown by FIG. 6. The members fixed to the plastic molding support, i.e. the two magnetic flux conductors 34 and 38 and the Hall generator 21, are accurately adjusted in their positions with respect to each other and in their positions relative to the plastic molding support by means of form locking, and more specifically in the case of Hall generator 21 by depression 33 into which the Hall generator precisely fits, for magnetic flux conductor 34 by lateral guidance members 56, 57 and mandrel 37 which fits into opening 36, and for magnetic flux conductor 38 by the attachment projection 39 of support 32 which fits accurately through a corresponding opening 41 in magnetic flux conductor 38 and through true-to-shape positioning of magnetic flux conductor 38 on the underside 43 of the plastic molding support in a depression 58 therein. Plastic molding support 32 is fixed in place together with the components located thereon by means of attachment projections 39, 40 which are passed through corresponding openings 44, 45 in the printed circuit board 18 and which are secured by barbs 46, 47. By this form locking, the radial position of the magnetic flux conductors 34, 38 and also the width of the radial air gaps 50, 51 can be maintained without additional expenditure even when mass production is adopted. The connections 48 and 49 of the Hall generator 21 are soldered only after support 32 with the magnetic flux conductors 34 and 38 and the Hall generator 21 is fitted to the printed circuit board 18.

In the assembled state, the two magnetic flux conductors 34, 38 enclose the Hall generator 21 therebetween by means of their radially inwardly directed ends. The radially outwardly directed end of magnetic flux conductor 34, accompanied by the recessing of a narrow radial air gap 50 is directed toward the inside of the permanent magnet 28, while the radially outwardly directed end of magnetic flux conductor 38, accompanied by the recessing of a narrow radial air gap 51 is directed toward the inside of the protruding edge 30. The two magnetic flux conductors 34, 38 in this way form a magnetic flux circuit which passes through the Hall generator from the inner pole, e.g. the pole N of permanent magnet 28 accompanied by the recessing of air gap 50, and which accompanied by the recessing of air gap 51 then passes via edge 30 to the opposite pole S.

Figure 8:
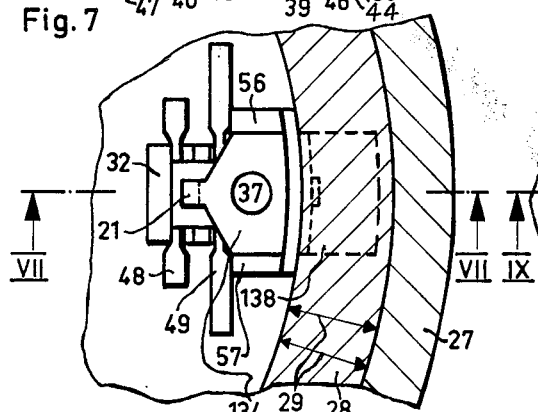
FIG. 8 is a section along line VIII—VIII in FIG. 7.

In order to concentrate a larger stray flux portion onto Hall generator 21, the two magnetic flux conductors 34, 38 are widened on their ends 134, 138 adjacent to air gaps 50 or 51, and are constricted from widened ends 134 and 138 to the narrower magnetic field-sensitive cross-section of the Hall generator, as can be seen in FIG. 8.

As magnet 28 is a plastic-bound magnet and has a limited induction of 0.1 to 0.2 Tesla, the cross-sectional increases of the widened portions 134, 138 are very advantageous. Without these increases it would be necessary to have extremely small air gaps, in order to obtain an adequate control flux on the Hall generator 21. Extremely small air gaps require additional expenditure for production.

The widened portions 134, 138 extend peripherally, because in the peripheral direction space is available for widening.

The widening of the magnetic field conductors is preferably fixed according to the following equation:

$$QL : QH = 4.5 \pm 15\%,$$

whereby $QL$ is the cross-section of the magnetic field conductor at the air gap side and $QH$ is the cross-section of the magnetic field conductor at the Hall generator side. The cross-section QH is preferably adapted with regard to shape and size to the magnetic field-sensitive cross-section of the Hall generator. In the interest of obtaining an intensive magnetic flux, the air gaps 50 and 51 are narrow and for tolerance reasons just as narrow as air gap 11. Air gaps 50 and 51 extend over a circular cylindrical peripheral portion. The above QL/QH ratio of about 4.5 is advantageous in the case of a Hall generator with a ferrite support and a plastic-bound barium ferrite magnet with a useful induction of 0.1 Tesla.

The Hall generator 21 is positioned in the space 31 between the two induction coils 115 and 116 and projects into this space with the projecting parts of plastic molding support 32 and magnetic flux conductor 34. This arrangement is advantageous because the plastic molding support 32 with the two magnetic flux conductors 34 and 38 can be housed in a space which is already available and therefore requires no additional axial overall height increase for the motor. When magnetic flux conductors 34, 38 are stamped out of a flat material, the widened portions 134, 138 are formed as trumpets.

Those parts of the pole clearances of the magnetizing of the permanent magnet 28 positioned in front of the group of laminations 12 are narrow to obtain an utmost favorable motorized efficacy. Those parts of the same pole clearances positioned at the edge of the permanent magnet are widened at least to the width of the widened portion 134. The widening of the pole clearance extends in the direction of the rotation of the motor. By that the pole clearance gets earlier into the efficacy of the magnetic flux conductor 38 and the control impulse for the commutator circuit will be released earlier, which simplifies the arrangement of the commutator circuit.

The rotor side radial tolerances for air gaps 50 and 51 through the radial adjustment of the rotor 53 relative to the stator 1 are adjusted along with the radial width of air gap 11 in the case of mass production. An incorrect axial adjustment, which with regard to air gap 11 can be taken into consideration without great disadvantages resulting, can also be taken into consideration with the selected arrangement of air gaps 50, 51 so that during mass production utilizing the present invention an axial readjustment is unnecessary.

During operation the rotor with the magnet magnetized in a bipolar manner rotates, and after rotation by 180° a pole change occurs within the magnetic flux effecting the Hall generator, and thereby the control signal for the commutator circuit will be released.

Figure 9:
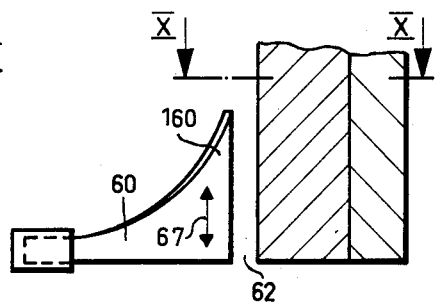
FIGS. 9 and 10 are views similar to FIGS. 7 and 8 of a second embodiment.
Figure 10:
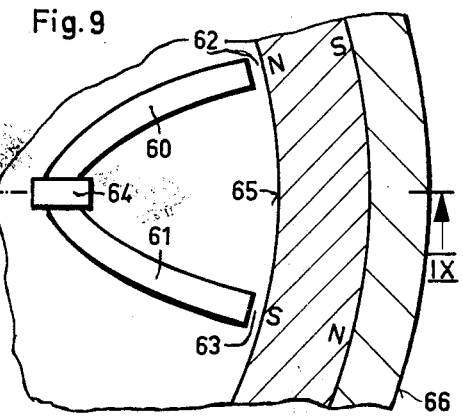

Whereas, in the case of the embodiment of FIGS. 1 to 8, the magnetic flux conductors lead from a radially inwardly positioned pole, e.g. the Pole N, to the appropriate radially outwardly directed Pole S, this is not the case in the embodiment shown in FIGS. 9 and 10. In the latter embodiment, the two magnetic flux conductors 60 and 61 which enclose a Hall generator 64 therebetween, with the recessing of radial air gaps 62, 63 lead to two opposite magnetic poles N and S which are juxtaposed on the radially inwardly located side 65 of rotor 66. In the case of magnetic flux conductors 60, 61, widened portions are again provided on the ends adjacent to the air gaps, whereby however only widened portion 160 of magnetic flux conductor 60 is visible in FIG. 9. These widened portions do not extend peripherally as in the case of the first embodiment, but axially as shown by arrow 67. As a result of this axial arrangement of the widened portions, the change in the stray flux passing through Hall generator 64 is more pronounced which in certain circumstances is advantageous for the precision of commutation.

The first two embodiments relate to a motor with an outer rotor, whereas the embodiments of FIGS. 11 to 14 relate to a motor with an inner rotor.

Figure 11:
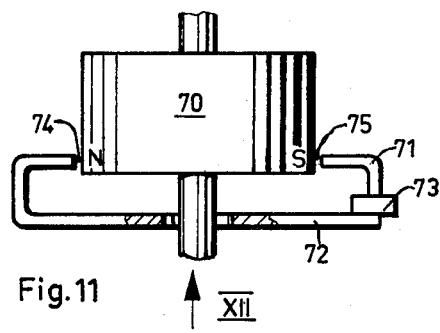
FIGS. 11 and 12 are views similar to FIGS. 7 and 8 of a third embodiment.
Figure 12:
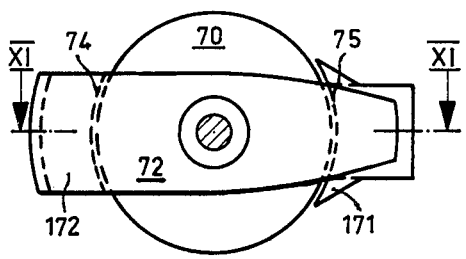

In FIGS. 11 and 12 the permanent magnet rotor 70 is radially premagnetized in a bipolar manner. The two magnetic flux conductors 71, 72 which enclose Hall generator 73 therebetween, with their ends pointed radially from the outside to the inside, face the diametrically arranged poles N and S with the recessing of a radial air gap 74, 75 in each case. The two ends 171, 172, as can be seen in FIG. 12, are peripherablly widened.

Figure 13:
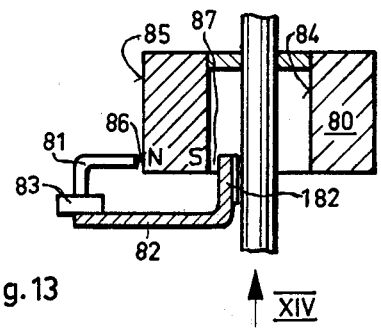
FIGS. 13 and 14 are views similar to FIGS. 7 and 8 of a fourth embodiment.
Figure 14:
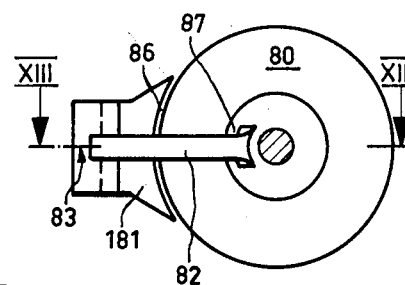
Figure 15:
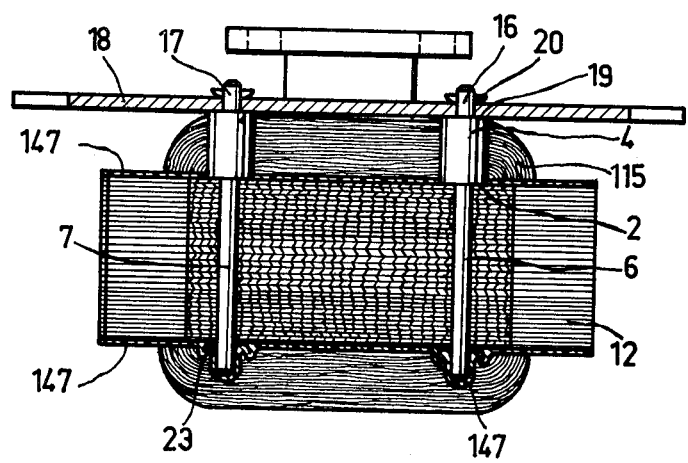
FIG. 15 illustrates the stator of FIG. 1 in a section along line XV—XV of FIG. 2.

According to FIGS. 13 and 14 the permanent magnet rotor 80 is annular and radially magnetized in a multipolar manner. The magnetic flux conductors 81 and 82 which enclose the Hall generator 83 therebetween extend from the inside 84 of rotor 80 to the outside 85 thereof and face opposite poles N and S with the recessing of radial gaps 86, 87. As can be seen in FIG. 14, the ends 181, 182 are peripherally widened.

Figure 16:
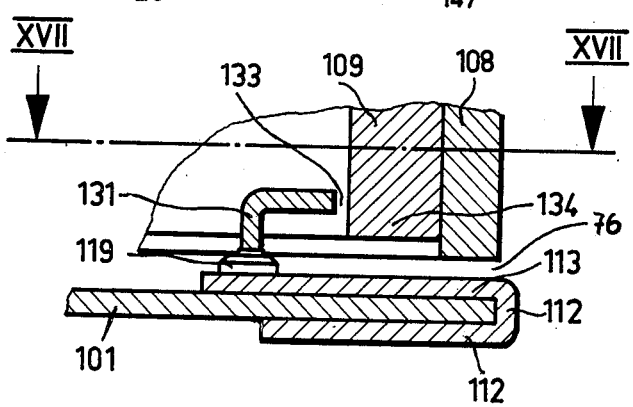
FIGS. 16 and 17 are views similar to FIGS. 7 and 8 of a fifth embodiment.
Figure 17:
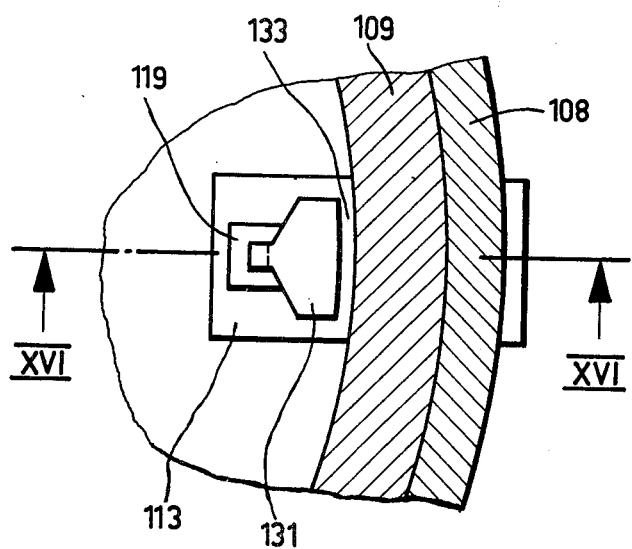

According to FIGS. 16 and 17 the permanent magnet 109 is radially magnetized in a bipolar manner surrounded by an iron sheet container 108 and is part of the rotor. The circuit board 101 is fitted to the stator. A U-shaped curved magnetic flux conductor 112 is placed around the edge of the circuit board. To the rotor side leg 113 of the magnetic flux conductor 112 the Hall generator 119 is fitted, and on the Hall generator is fitted the second magnetic flux conductor 131 which leads to the inside of the permanent magnet 109 with the recessing of a radially directed first narrow air gap 133. The magnetic flux conductor 131 is widened at the end thereof adjacent to the air gap 133 and is constricted at its other end to the narrower magnetic field-sensitive cross-section of the Hall generator 109. The magnetic flux conductor 112 has the same width over its whole length and this width extends considerably beyond the width of the field-sensitive cross-section of the Hall generator 109. The magnetic flux conductor 112 extends to a position in front of the free edge of the container 108. An axial second narrow air gap 76 is enclosed between the free edge of the container 108 and the magnetic flux conductor 112.

Various modifications may be made to the above specifically described structural arrangements, without departing from the scope of the present invention.

What is claimed is:

1. A brushless d.c. motor comprising:
   a stator;
   a permanent magnet rotor having opposite poles and positioned with respect to said stator to provide a narrow radially directed air gap therebetween;
   a stationary magnetic flux-sensitive control member;
   a first magnetic flux conductor having a first end at said control member and a second end extending to a position closely adjacent a first pole of said rotor, a first narrow air gap being between said first pole and said second end of said first flux conductor;
   a second magnetic flux conductor separate from said first flux conductor and having a first end at said control member and a second end extending to a position closely adjacent a second pole of said rotor, a second narrow air gap being between said second pole and said second end of said second flux conductor;

said second ends of said first and second flux conductors being substantiallly wider in cross-sectional dimension than said control member; and at least one of said first ends of said first and second flux conductors being constricted in size to the cross-sectional dimension of said control member.

2. A motor as claimed in claim 1, wherein said rotor comprises an annular radially magnetized permanent magnet, and an annular magnetic flux conduction container radially outwardly surrounding said permanent magnet, one axial end of said container extending beyond a respective adjacent axial end of said permanent magnet; and wherein said second end of said first flux conductor extends toward an inner peripheral surface of said permanent magnet, and said second end of said second flux conductor extends radially partially beyond said axial end of said permanent magnet toward said one axial end of said container extending axially beyond said permanent magnet; said second flux conductor being positioned substantially axially of said first flux conductor; the path of magnetic flux passing through said flux conductors and said control member in a substantially radial plane.

3. A motor as claimed in claim 2, wherein said rotor surrounds said stator.

4. A motor as claimed in claim 3, further comprising a circuit board fixed to said rotor adjacent said one end of said container, and a plastic support supporting said control member and said first flux conductor and having elastically deformable locking projections extending through openings in said circuit board, said second flux conductor being positioned between said plastic support and said circuit board.

5. A motor as claimed in claim 4, wherein said first end of said first flux conductor extends axially from said control member, said second end of said first flux conductor extends radially toward said rotor, and said second flux conductor is planar.

6. A motor as claimed in claim 4, wherein said circuit board is planar.

7. A brushless d.c. motor comprising:
a stator;
a permanent magnet rotor positioned with respect to said stator to provide a radially directed air gap therebetween;
a stationary magnetic flux-sensitive control member and a stationary magnetic flux conductor device including at least two magnetic flux conductors with said control member therebetween, said conductors being in a magnetic circuit between unlike poles of said rotor and concentrating a part of magnetic flux emanating from said poles onto said control member; and
said conductors being spaced from said rotor by respective narrow air gaps, at least one of said narrow air gaps being radially directed, the said conductor spaced by said radially directed narrow air gap, at a first end thereof adjacent said radially directed narrow air gap, being cross-sectionally wider than the magnetic flux-sensitive cross-section of said control member.

8. A motor as claimed in claim 7, wherein both said narrow air gaps are radially directed.

9. A motor as claimed in claim 8, wherein said rotor comprises an annular radially magnetized permanent magnet surrounding said stator, and a magnetic flux-conducting member radially outwardly surrounding said permanent magnet, said member having an axial end projecting beyond the adjacent axial end of said permanent magnet, a first of said conductors facing a radially inwardly positioned pole of said permanent magnet with a first of said narrow air gaps therebetween, and a second of said conductors extending beyond said axial end of said permanent magnet to said projecting axial end of said member.

10. A motor as claimed in claim 9, wherein both of said conductors, at the ends thereof adjacent the respective said narrow air gaps, are cross-sectionally wider than the magnetic flux-sensitive cross-section of said control member.

11. A motor as claimed in claim 9, further comprising a circuit board fixed to said stator adjacent said axial end of said member, and a plastic support supporting said control member and having elastically deformable locking projections extending through openings in said circuit board.

12. A motor as claimed in claim 8, wherein said rotor includes an annular permanent magnet surrounding said stator and a magnetic flux-conducting member radially surrounding said permanent magnet, said member having an axial end projecting beyond the adjacent axial end of said permanent magnet.

13. A motor as claimed in claim 8, wherein both said conductors, at the ends thereof adjacent the respective said narrow air gaps, are cross-sectionally wider than the magnetic flux-sensitive cross-section of said control member.

14. A motor as claimed in claim 7, wherein said rotor comprises an annular radially magnetized permanent magnet surrounding said stator, and a magnetic flux-conducting member radially outwardly surrounding said permanent magnet, said member having an axial end projecting beyond the adjacent axial ends of said permanent magnet, a first of said conductors facing a radially inwardly positioned pole of said permanent magnet with a first of said narrow air gaps therebetween, and a second of said conductors extending beyond said axial end of said permanent magnet to said projecting axial end of said container, with a second of said narrow air gaps extending axially between said second conductor and said projecting axial end of said member.

15. A motor as claimed in claim 14, wherein both said conductors, at the ends thereof adjacent the respective said narrow air gaps, are cross-sectionally wider than the magnetic flux-sensitive cross-section of said control member.

16. A motor as claimed in claim 7, further comprising a circuit board fixed to said stator.

17. A motor as claimed in claim 16, wherein said circuit board is fixed to said stator by means of mandrels extending from said stator.

18. A motor as claimed in claim 17, wherein said mandrels are arranged symmetrically with respect to a main magnetic axis of said stator.

19. A motor as claimed in claim 16, wherein said control member comprises a Hall generator for controlling a commutator circuit, said circuit board comprises a printed circuit board having printed on the motor side thereof conductors for the commutator circuit and having positioned on the side thereof remote from the motor the remaining circuit elements of the commutator circuit.

20. A motor as claimed in claim 16, further comprising a plastic support supporting said control member and having elastically deformable locking projections extending through openings in said circuit board.

21. A motor as claimed in claim 20, wherein said plastic support has therein a recess, said control member fitting in said recess.

22. A motor as claimed in claim 21, wherein a first of said conductors is an L-shaped member having a first leg extending axially from said control member and a second leg extending radially toward said rotor, said plastic support having a mandrel extending through an opening in said second leg.

23. A motor as claimed in claim 7, wherein said conductor spaced by said radially directed narrow air gap has a second end which is cross-sectionally narrower than said first end thereof, the cross-section of said ends being according to the equation:

$$QL : QH = 4.5 \pm 15\%,$$

wherein $QL$ is a cross-section of said first end, and $QH$ is the cross-section of said second end.

24. A motor as claimed in claim 23, wherein said rotor includes a plastic-bound barium ferrite magnet.

25. A motor as claimed in claim 7, wherein said stator includes two induction coils with a space therebetween, and said control member is mounted in said space.

26. A motor as claimed in claim 7, wherein both of said conductors have widened ends facing respective of said narrow air gaps.

27. A motor as claimed in claim 26, wherein said widened ends are trumpet-shaped.

28. A motor as claimed in claim 26, wherein the widening of said widened ends extends peripherally of said rotor.

29. A motor as claimed in claim 7, wherein said rotor comprises an annular permanent magnet having unlike poles juxtaposed in a peripheral direction.

30. A motor as claimed in claim 29, wherein said permanent magnet radially surrounds said stator, and said unlike poles are on the inner annular surface of said permanent magnet.

31. A motor as claimed in claim 29, wherein both of said conductors have widened ends facing respective of said narrow air gaps.

32. A motor as claimed in claim 31, wherein the widening of said widened ends extends axially of said permanent magnet.

33. A motor as claimed in claim 8, wherein said stator surrounds said rotor, said two magnetic flux conductors with their ends peripherally widened and adjacent said air gaps project to diametrically arranged unlike poles.

34. A motor as claimed in claim 9, wherein said member comprises a container to receive said permanent magnet.

35. A motor as claimed in claim 12, wherein said member comprises a container to receive said permanent magnet.

* * * * *